United States Patent [19]
Brockmann

[11] Patent Number: 5,437,019
[45] Date of Patent: Jul. 25, 1995

[54] ADDRESSING METHOD AND APPARATUS FOR A COMPUTER SYSTEM

[75] Inventor: Russell C. Brockmann, Fort Collins, Colo.

[73] Assignee: Hewlett-Packard Company, Palo Alto, Calif.

[21] Appl. No.: 217,001

[22] Filed: Mar. 23, 1994

Related U.S. Application Data

[63] Continuation of Ser. No. 628,547, Dec. 17, 1990, abandoned.

[51] Int. Cl.⁶ .......................... G06F 12/00; G06F 1/00
[52] U.S. Cl. .............................. 395/400; 364/DIG. 2; 364/955; 364/957; 364/957.2; 364/961.3
[58] Field of Search .............. 365/63, 69, 230.03, 365/230.04; 395/400, 425; 340/825.52, 825.07

[56] References Cited

U.S. PATENT DOCUMENTS

| | | | |
|---|---|---|---|
| 4,050,098 | 9/1977 | Seipp | 364/900 |
| 4,099,256 | 7/1978 | Draper | 395/425 |
| 4,253,087 | 2/1981 | Saal | 340/825.52 |
| 4,675,808 | 6/1987 | Grinn et al. | 365/230.03 |
| 4,701,878 | 10/1987 | Gunkel | 364/900 |
| 4,727,475 | 2/1988 | Kiremidjian | 395/325 |
| 4,896,301 | 1/1990 | Ogawa | 365/230.03 |
| 5,065,154 | 11/1991 | Kaiser et al. | 340/825.52 |

FOREIGN PATENT DOCUMENTS

| | | |
|---|---|---|
| 0117954A3 | 12/1983 | European Pat. Off. . |
| 0340325A1 | 5/1988 | European Pat. Off. . |
| 0211385 | 12/1983 | Japan . |

OTHER PUBLICATIONS

Marcus, M. P. and J. P. Orosz, "Chip Selection Circuit", IBM Technical Disclosure Bulletin, vol. 21, No. 9, Feb. 1979.

*Primary Examiner*—Rebecca L. Rudolph

[57] ABSTRACT

Each card slot in a computer system receives a different ordering of address lines than each of the other card slots so that the ordering of the address lines at each card slot is indicative of its physical address relative to the other card slots. Means responsive to codes provided on at least selected ones of the address lines for establishing the hard and soft physical addresses of cards to be inserted into the slots may be provided.

26 Claims, 3 Drawing Sheets

|   | S1 | S2 | S3 | S4 |
|---|----|----|----|----|
| A | A0 | A1 | A0 | A1 |
| B | A1 | A0 | A1 | A0 |
| C | A2 | A2 | A3 | A3 |
| D | A3 | A3 | A2 | A2 |
| E | A4 | A4 | A4 | A4 |
| F | A5 | A5 | A5 | A5 |

ADDRESSING METHOD AND APPARATUS FOR A COMPUTER SYSTEM

This is a continuation of application Ser. No. 08/628,547 filed on Dec. 17, 1990, now abandoned.

FIELD OF THE INVENTION

The present invention relates generally to computer systems. More particularly, the present invention relates to a method and apparatus for addressing cards, such as memory cards, installed in card slots of a backplane of a computer system without prior user intervention, such as setting DIP switches to select an address range, and without the use of dedicated signal lines at the card slots to set its address range.

BACKGROUND OF THE INVENTION

Most modern day computer systems employ a backplane having a plurality of card slots (i.e., edge connectors) for receiving various types of cards, such as memory cards, multi-purpose I/O cards, controller cards, cards associated with peripheral devices, and the like, for communicating with a processor associated with the computer system. The backplane usually includes a bus that has a plurality of address lines for addressing the various cards, as well as a number of data lines for bidirectionally communicating data (or instructions) between the cards and the processor. In the case of memory cards, each card contains a plurality of addressable locations, i.e., each of the separate memory locations, for storing data, and possibly instructions.

In order that the processor may select a card and communicate with it, each card (or card slot in some systems) is frequently assigned an address range so that the processor can select the card by placing an appropriate address on the address lines of the bus. Generally, a number of the address lines are designated as "select" lines, and these lines are used for selecting the actual card, while some or all of the remaining address lines are used for addressing addressable locations on the selected card. For example, while a sixteen bit address bus may address up to $2^{16}$ memory locations, four of the address bits may be designated as "select" address bits for selecting $2^4$ memory cards containing the addressable locations. The particular sequence of "select" bits applied on the "select" address lines to which the card will respond is known as its "physical address."

One common method in the prior art for selecting the physical address of a card is to provide a number of DIP (dual in line) switches that are set by the user. Those skilled in the art will appreciate that the setting of these switches may also set the address range of the card. A problem with user configured DIP switches is that the system must be powered down and the card removed to alter the physical address and address range of the card. For example, the DIP switches may be incorrectly configured at the time of an initial installation, and therefore the system must be powered down and the card removed so that the DIP switches can be properly set. Thus, the use of DIP switches to select a physical address and address range of a card can be cumbersome and time consuming. The use of DIP switches is also problematic since the user must make the switch selections, thus introducing the possibility of human error.

Some cards employ fixed, hard-wired addresses, but, as will be appreciated, the address of these cards cannot be easily changed.

Another method known requires the use of dedicated "slot" signal pins on the backplane to set the physical addresses of a card slot. In this methodology, certain pins of each card slot are hardwired to receive a different pattern of dedicated lines from the backplane. Consider an exemplary system having a six bit address bus (A0–A5), with two of the address lines, e.g., A4, A5, employed to select one of the cards in the backplane. In such system, lines A4 and A5 of each card slot would commonly be coupled to dedicated signal lines (i.e., not a part of the address bus), such as, e.g., GND and VDD, with each card slot receiving a unique combination of GND and VDD at the A4 and A5 lines of the card slot. Each card determines the slot it's in by examining the values on A4 and A5. A problem with this type of system is that the physical address of each card slot is fixed and cannot be easily changed. Moreover, additional signal lines must be provided on the already crowded backplane.

It is therefore desirable to provide an apparatus and method that allows complete flexibility in address range assignment without requiring signal overhead or user intervention. The present invention achieves these goals.

SUMMARY OF THE INVENTION

According to the invention, a computer system comprises a bus having a plurality of address lines coupled to plural card slots in the system, with each card slot receiving a unique ordering of address lines, i.e., each card slot receives a different ordering of address lines than each of the other card slots in the system. The ordering of the address lines at each card slot is indicative of the physical location (i.e., physical address) of the card slot relative to the other card slots in the system. According to one embodiment of the invention, each card installed in a card slot comprises means responsive to codes provided on at least selected ones of the address lines for enabling the card to determine the physical address of the slot into which it has been installed (hard physical address) and for establishing the address range of the card (soft physical address). However, in the case of cards having a fixed address range, e.g., memory cards having a fixed size memory, such means may not be necessary since the physical address of the slot may correspond directly to the address range to which the card responds.

According to one embodiment of the invention, the address lines are ordered so that selected pairs of address lines are reversed at each card slot relative to immediately preceding and immediately succeeding card slots in the system. The ordering of a lowest order pair of address lines is reversed at every other card slot, and the ordering of each succeeding higher order pair of address lines is reversed at half the frequency of the ordering of each immediately preceding pair of address lines. However, the invention is not limited to this ordering, and any ordering wherein each card slot receives a unique ordering of the address lines falls within the scope of the invention.

In applications where on-card addressing must be performed with the address bits in the same pre-selected order as emanating from the processor, there is provided, according to the invention, means for effectively re-establishing the preselected order on the card itself.

Other features and benefits of the invention will be apparent from the following specification and drawings.

DETAILED DESCRIPTION OF THE PREFERRED EMBODIMENT

Figures 1, 2:
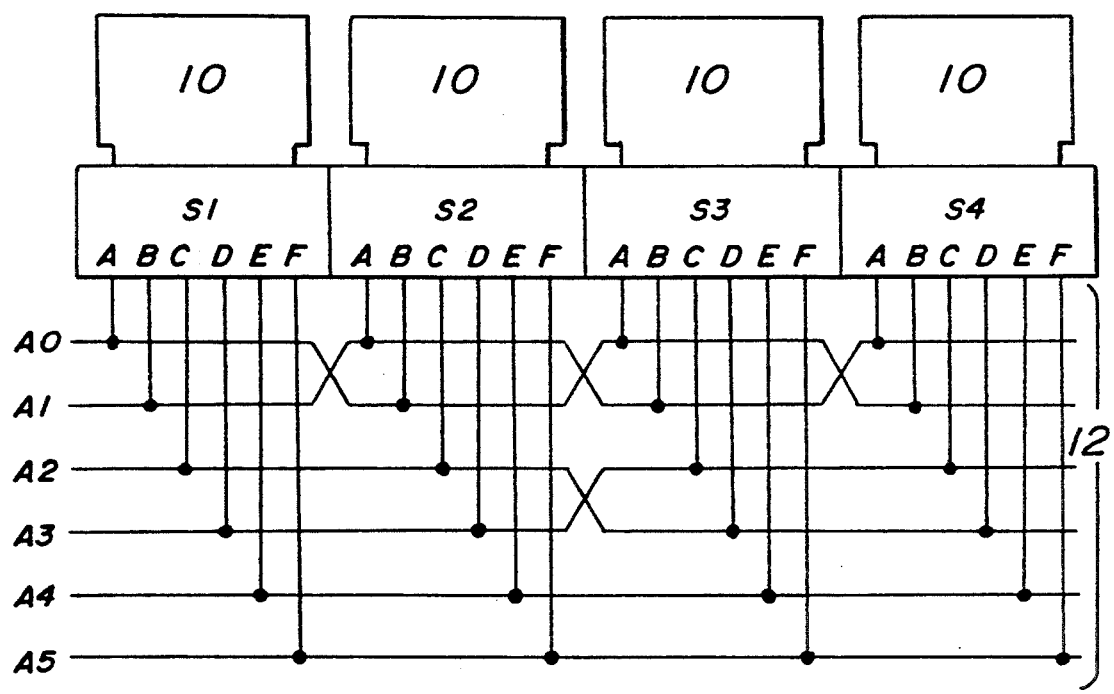
FIG. 1 illustrates one embodiment of an address bus according to the present invention.
FIG. 2 is a table illustrating the ordering of the address lines of the embodiment of FIG. 1.

Referring now to the drawings, wherein like numerals represent like elements, there is illustrated in FIG. 1 a simplified implementation of the present invention according to one preferred embodiment. FIG. 1 illustrates application of the invention for a simple computer system employing a six-bit address bus 12 comprising address lines A0–A5; however, the present invention has applicability to address busses of any width. The six-bit implementation illustrated in FIG. 1 is provided for ease of explanation only and the present invention is not limited thereto.

As shown, the backplane of the exemplary computer system comprises a plurality of card slots S1–S4, each for receiving a card 10 of any known type, such as a memory card, controller card, a card associated with a peripheral device, etc. Each card slot S1–S4 has a plurality of pins A–F for communicating with the address bus 12 and with the card 10 installed therein. Each card 10 communicates with a processor (e.g., FIG. 3) associated with the computer system in well-known fashion, wherein the processor provides addresses on the address bus 12 to select one of the cards 10, and in the case of cards such as memory cards, to address individual addressable locations, such as memory locations containing data, thereon.

The left side of FIG. 1 illustrates the address bus 12 as it emanates from the processor. It will be seen that the ordering of the address lines is in a preselected order, i.e., in the sequence A0, A1, A2, A3, A4, A5, as is conventional. However, according to the invention, the address lines A0–A5 are coupled to the pins A–F of the card slots S1–S4 in a manner wherein the pins of each card slot S1–S4 receive a different ordering of address lines than each of the other card slots. It will be appreciated, therefore, that each card slot S1–S4 receives a unique ordering of address lines, and that this ordering is indicative of the physical location or address of the particular card slot relative to the other card slots in the system.

According to one embodiment of the invention, the ordering of the address lines is as shown in FIG. 1. As shown therein, and as will be further appreciated from FIG. 2, the ordering of selected pairs of address lines is reversed at each card slot relative to immediately preceding and immediately succeeding card slots in the system. Thus, card slot S1 receives the address lines in the same order as they emanate from the processor. However, the ordering of address lines A0 and A1 is reversed at card slot S2. At card slot S3, the ordering of address lines A2 and A3 is reversed, whereas in the case of card slot S4, the ordering of address lines A0 and A1 is reversed, and the ordering of address lines A2 and A3 is reversed. Moreover, in the embodiment illustrated in FIGS. 1 and 2, the ordering of the address lines is binary in nature. Thus, the ordering of the lowest pair of address lines (A0, A1) is reversed at every other card slot (S1, S3, etc.) whereas the ordering of each succeeding higher order pair of address lines (such as the pair A2, A3 or the pair A4, A5) is reversed at half the frequency of the ordering of each immediately preceding pair of address lines. The table of FIG. 2 illustrates the binary ordering in greater detail. Again, it should be emphasized that although only a six-bit address bus and four card slots are shown, this is for purposes of simplicity and ease of explanation only, and any width address bus and any appropriate number of card slots may be provided. Moreover, it should be emphasized that the present invention is not limited to the binary ordering of address lines illustrated in the drawings.

The present invention may be employed as thus far described in the case of cards 10 that have a fixed number of addressable locations thereon. In such case, however, the address range of each card must directly correspond to the physical address of the card slot into which it has been inserted. As mentioned, the physical address of a card slot is dictated by the particular ordering of the address lines A0–A5 which it happens to receive. For example, if each of the cards 10 are memory cards of fixed size, and each of their address ranges corresponds to the physical address of the card slot S1–S4 into which it is inserted, the present invention will perform satisfactorily. However, it will be apparent to those skilled in the art that such system lacks flexibility, and indeed, may place substantial restrictions upon the types of cards that may be employed in such system.

To elaborate upon one problem with the system and method of FIGS. 1 and 2, as thus far described, consider the following table which illustrates every address code that may be sent by the processor on lines A0–A3 (first column) and how they will be received by each of the card slots (second through fifth columns) S1–S4 of the exemplary system of FIG. 1 that employs a binary ordering of the address lines.

| Processor | | | | Slot 1 | | | | Slot 2 | | | | Slot 3 | | | | Slot 4 | | | | |
| --- | --- | --- | --- | --- | --- | --- | --- | --- | --- | --- | --- | --- | --- | --- | --- | --- | --- | --- | --- | --- |
| A0 | A1 | A2 | A3 | A0 | A1 | A2 | A3 | A1 | A0 | A2 | A3 | A0 | A1 | A3 | A2 | A1 | A0 | A3 | A2 | |
| 0 | 0 | 0 | 0 | 0 | 0 | 0 | 0 | 0 | 0 | 0 | 0 | 0 | 0 | 0 | 0 | 0 | 0 | 0 | 0 | 0/1/2/3 alias |
| 0 | 0 | 0 | 1 | 0 | 0 | 0 | 1 | 0 | 0 | 0 | 1 | 0 | 0 | 1 | 0 | 0 | 0 | 1 | 0 | 0/1 alias, 2/3 alias |
| 0 | 0 | 1 | 0 | 0 | 0 | 1 | 0 | 0 | 0 | 1 | 0 | 0 | 0 | 0 | 1 | 0 | 0 | 0 | 1 | 0/1 alias, 2/3 alias |
| 0 | 0 | 1 | 1 | 0 | 0 | 1 | 1 | 0 | 0 | 1 | 1 | 0 | 0 | 1 | 1 | 0 | 0 | 1 | 1 | 0/1/2/3 alias |
| 0 | 1 | 0 | 0 | 0 | 1 | 0 | 0 | 1 | 0 | 0 | 0 | 0 | 1 | 0 | 0 | 1 | 0 | 0 | 0 | 0/2 alias, 1/3 alias |
| 0 | 1 | 0 | 1 | 0 | 1 | 0 | 1 | 1 | 0 | 0 | 1 | 0 | 1 | 1 | 0 | 1 | 0 | 1 | 0 | CODE OK |
| 0 | 1 | 1 | 0 | 0 | 1 | 1 | 0 | 1 | 0 | 1 | 0 | 0 | 1 | 0 | 1 | 1 | 0 | 0 | 1 | CODE OK |
| 0 | 1 | 1 | 1 | 0 | 1 | 1 | 1 | 1 | 0 | 1 | 1 | 0 | 1 | 1 | 1 | 1 | 0 | 1 | 1 | 0/2 alias, 1/3 alias |
| 1 | 0 | 0 | 0 | 1 | 0 | 0 | 0 | 0 | 1 | 0 | 0 | 1 | 0 | 0 | 0 | 0 | 1 | 0 | 0 | 0/2 alias, 1/3 alias |

-continued

| Processor | | | | Slot 1 | | | | Slot 2 | | | | Slot 3 | | | | Slot 4 | | | | |
|---|---|---|---|---|---|---|---|---|---|---|---|---|---|---|---|---|---|---|---|---|
| A0 | A1 | A2 | A3 | A0 | A1 | A2 | A3 | A1 | A0 | A2 | A3 | A0 | A1 | A3 | A2 | A1 | A0 | A3 | A2 | |
| 1 | 0 | 0 | 1 | 1 | 0 | 0 | 1 | 0 | 1 | 0 | 1 | 1 | 0 | 1 | 0 | 0 | 1 | 1 | 0 | CODE OK |
| 1 | 0 | 1 | 0 | 1 | 0 | 1 | 0 | 0 | 1 | 1 | 0 | 1 | 0 | 0 | 1 | 0 | 1 | 0 | 1 | CODE OK |
| 1 | 0 | 1 | 1 | 1 | 0 | 1 | 1 | 0 | 1 | 1 | 1 | 1 | 0 | 1 | 1 | 0 | 1 | 1 | 1 | 0/2 alias, 1/3 alias |
| 1 | 1 | 0 | 0 | 1 | 1 | 0 | 0 | 1 | 1 | 0 | 0 | 1 | 1 | 0 | 0 | 1 | 1 | 0 | 0 | 0/1/2/3 alias |
| 1 | 1 | 0 | 1 | 1 | 1 | 0 | 1 | 1 | 1 | 0 | 1 | 1 | 1 | 1 | 0 | 1 | 1 | 1 | 0 | 0/1 alias, 2/3 alias |
| 1 | 1 | 1 | 0 | 1 | 1 | 1 | 0 | 1 | 1 | 1 | 0 | 1 | 1 | 0 | 1 | 1 | 1 | 0 | 1 | 0/1 alias, 2/3 alias |
| 1 | 1 | 1 | 1 | 1 | 1 | 1 | 1 | 1 | 1 | 1 | 1 | 1 | 1 | 1 | 1 | 1 | 1 | 1 | 1 | 0/1/2/3 alias |

As can be seen, four of the addresses will work (those marked "CODE OK" in the COMMENTS column), but the remaining codes result in aliasing, i.e., conflicts as a result of addressing more than one card slot. Thus, four bits are required to choose four slots. It will also be seen that when binary ordering of the address bus is used, each bit pair (i.e., bit pair A0, A1 and bit pair A2, A3) must have an XOR pattern thereon to effect correct addressing. The number of slots that can be addressed using this binary ordering system is $2^B$, where B is the number of bit pairs in the particular implementation. In the table above, B equals 2, and the number of slots that can be addressed is 4. Thus the addressing range of this particular implementation is restricted.

It can be shown the number of different possible combinations of ordering an N bit address bus is N!. It can also be shown that: for even values of N, N/2 bits will be 1's and N/2 bits will be 0's, and the maximum number of slots that can be addressed (without aliasing) is $N!/((N/2)!*(N/2)!)$; for odd values of N, either $(N-1)/2$ bits will be 1's and $(N+1)/2$ bits will be 0's or $(N+1)/2$ bits will be 1's and $(N-1)/2$ bits will be 0's, and the maximum number of slots that can be addressed (without aliasing) is $N!/((N+1)/2)!*((N-1)/2)!)$.

Figure 3:
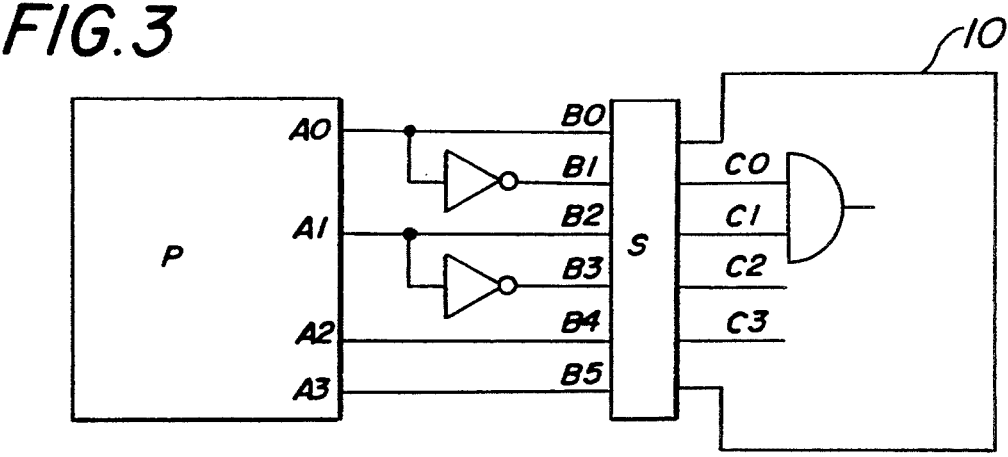
FIG. 3 illustrates another embodiment of an address bus according to the present invention.

As mentioned above, the invention as thus far described may be employed with "fixed size" memory systems. However the address sent on the address bus 12 requires extra signal lines if the binary ordering of address lines discussed above is employed. Consider a simple processor P having a four bit address bus A0–A3 (e.g., as in the table above). The system described thus far requires that two additional address bits (e.g., B1, B3) be provided to each slot. See FIG. 3. The additional bits B1, B3 are simple inversions of two of the address bits A0, A1 emanating from the processor P. The card 10 has the same number of address line inputs C0–C3 as the processor P (four in this example), but the address line inputs C0–C3 on the card 10 are connected to receive only four of the six address bits B0–B5 provided at the slot S. In FIG. 3, the address line inputs C0, C1 on the card 10 perform the "card select" function, so C0 would be connected to either B0 or B1, and C1 would be connected to either B2 or B3, depending upon the slot S1–S4 in which the card 10 has been inserted. Although two extra lines have been added to the back plane, only four lines are required on the card 10, and no DIP switches are required.

If a more general, non-binary ordering of the address lines is employed, then mapping logic may need to be provided on the memory card, e.g., a ROM, PLA, etc. to perform memory decoding.

According to a further embodiment of the invention, no extra lines are required to implement the instant addressing method and system. This embodiment of the invention permits each card 10 to be addressed individually to set up the address range to which it will respond. According to this embodiment, the address lines are uniquely ordered as above described. Further, each card 10 comprises means responsive to codes provided on at least selected ones of the address lines for enabling the card to determine the physical address of the slot into which it has been installed (hard physical address) and for establishing the address range of the card (soft physical address). Such means are illustrated in FIG. 4.

Before commencing with a discussion of this aspect of the invention, it would be helpful to first discuss the relevant details of a conventional prior art memory card. Reference will be made to FIG. 4 for such discussion, although it should be understood that only a portion of FIG. 4 exemplifies the prior art, and that the remainder exemplifies the invention. It should also be understood that the example of a memory card is provided solely for purposes of explaining the invention, and that the present invention is not limited to use on memory cards.

Figure 4:
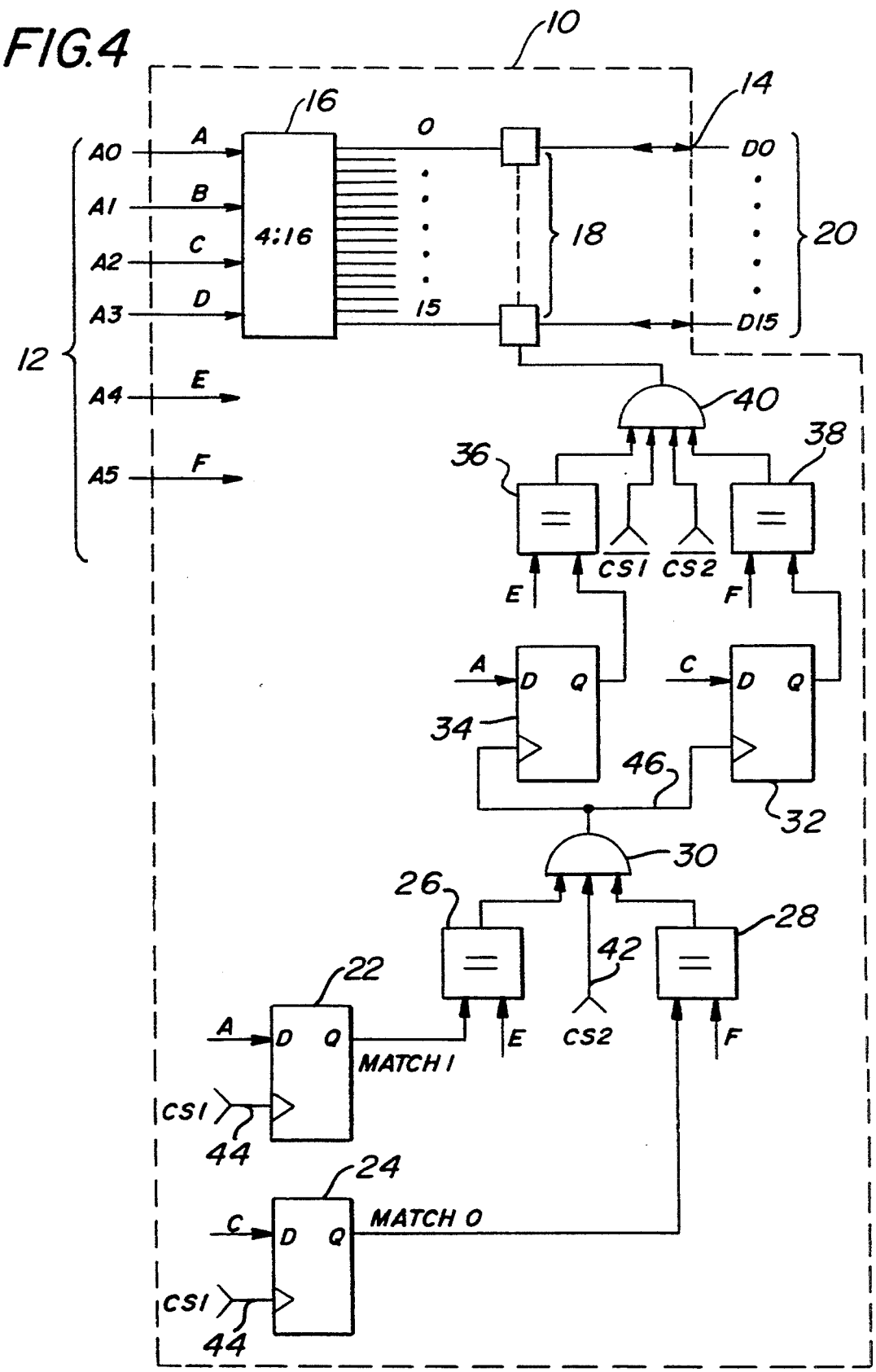
FIG. 4 illustrates an exemplary card, such as a memory card, in simplified block diagram form, according to one embodiment of the present invention.

The exemplary memory card 10 of FIG. 4 receives the address bus 12 in conventional fashion. Data is provided on a data bus 20, also in well known fashion. As is common in the art, selected address lines are employed to select one of the cards, while the remaining address lines (or at least a portion thereof) are employed to address the individual addressable locations on each card 10. In the exemplary card 10 of FIG. 4, address lines A4, A5 have been employed as the "select" address lines. Thus, address lines A0–A3 are employed to address one of a plurality of memory locations 18 on the card 10 by way of a 4:16 multiplexer 16. As shown in FIG. 4, both the address bus 12 and the data bus 20 are coupled to a backplane of the system by way of connector pins 14 of each card slot.

In the prior art employing DIP switches for address selection, a card 10 is addressed by providing the "select" address bits appearing on the address select lines A4, A5 to circuitry (not shown) which generally compares the address bits appearing on the "select" address lines A4, A5 to a user configured address set by way of the DIP switches. These settings designate the address range to which the card 10 shall be responsive. When a match is found to exist between the address bits appearing on the "select" address lines and the DIP switch settings, the individual memory locations 18 become responsive to address bits appearing on the remaining address lines A0–A3. What has been described thus far in respect to the card 10 of FIG. 1 is well known in the art.

According to the invention, each card 10 comprises means responsive to codes provided on at least selected ones of the address lines for enabling the card to determine the physical address of the slot into which it has been installed (hard physical address) and for establishing the address range of the card (soft physical address). Exemplary circuitry for performing these functions comprises components 22–40, discussed in detail below. It should be understood that the invention is not in any way limited to the illustrated circuitry and that any circuitry that performs the principal hard physical address and soft physical address selection functions are considered within the scope of this invention.

The exemplary circuit of FIG. 4 comprises a pair of latches 22, 24 each receiving a control signal CS1 at its clock input 44. The latch 22 receives at its data input the address bit appearing on one of the selected address input lines of the card. In the example of FIG. 4, latch 22 receives the address bit provided to the card 10 on the "A" address input line. Similarly, latch 24 receives at its data input the address bit appearing on another one of the selected address input lines. In the example of FIG. 4, latch 24 receives the address bit provided to the card 10 on the "C" address input line. It will be appreciated that the particular address lines A0–A5 that communicate with the address input lines A, C in the example of FIG. 2 may vary depending upon the particular ordering of the address lines employed and the slot S1–S4 into which the card 10 has been inserted. For example, if the card has been inserted into slot S1, the address input lines A, C will communicate with address lines A0, A2, respectively. However, if the card has been inserted into slot S4, then address input lines A, C will communicate with address lines A1, A3, respectively. It will also be appreciated that the address bits appearing on the address bit lines A, C in the example of FIG. 4 will be latched into the latches 22, 24 at the time of occurrence of the control signal CS1 appearing on lines 44. These latched bits are then employed as described below. As will become evident hereinafter, the data stored in the latches 22, 24 after the occurrence of the control signal CS1 will be indicative of the slot into which the card 10 has been inserted. In other words, the hard physical address of the card 10 is stored in these latches. Note that the output of latch 22 has been labeled MATCH 1 and that the output of latch 24 has been labeled MATCH 0.

The exemplary circuitry of FIG. 4 also includes a pair of latches 32, 34 each receiving at its clock input 46 a signal provided by a logic circuit (AND gate) 30. The latch 34 receives at its data input the same address bit provided to the latch 22, i.e., the address bit appearing on address input line A. Similarly, latch 32 receives at its data input the same address bit provided to latch 24, i.e., the address bit appearing on address input line C. Thus, the address bits appearing on the address input lines A, C will be latched into the latches 32, 34 at the time of occurrence of the signal provided by logic circuit 30. These latched bits are then employed as described below. As will become evident hereinafter, the data stored in the latches 32, 34 after the occurrence of the signal from logic circuit 30 will be indicative of the address range to which the card 10 will respond when it has been selected. In other words, the soft physical address of the card 10 is stored in the latches 32, 34. This feature of the invention enables the address range of each card 10 to be individually established.

During an initial phase of operation of the computer, such as during a reset cycle or at any other appropriate or desired time, a code for setting the hard physical address of a card 10 is provided on the selected address input lines that communicate with the latches 22, 24. The control signal CS1 is provided during this time and allows this code to be latched by the latches 22, 24. The control signal CS1 may be, e.g., a reset signal, or a unique combination of existing control signals generated by the processor.

It will be appreciated from an examination of FIGS. 1 and 2 and from the foregoing discussion that if a "correct" code is sent out by the processor then, due to the different ordering of the address lines at each card slot, each of the cards 10 will receive a different code at its address input lines A, C. Therefore the latches 22, 24 of each card will have a different code latched therein after the occurrence of the CS1 control signal. A "correct" code is one that will not result in aliasing. Thus, the particular code sent on the address bus must guarantee that each card will see a different code. The processor may be suitably programmed to ensure this result. If binary ordering of the address lines has been used, then this may be accomplished by always sending an XOR pattern on bit pairs of the address bus. Since the code received by each card 10 depends upon the slot into which it has been inserted, then the stored code essentially "tells" the card the hard physical address of the slot into which it has been inserted. Thus, the hard physical address of the card 10 is stored in the latches after the foregoing has occurred.

Also during the initial phase of operation, but immediately after the hard physical address has been sent to the cards 10 as above described, the soft physical address of each card is individually set. This is performed as follows. Each card is addressed via address lines A4, A5, i.e., via the select lines. These address bits are applied to comparators 26, 28 at E, F. Simultaneously, a code corresponding to the desired address range (soft physical address) of the addressed card is placed on the address lines A0–A3 that communicate with the address input lines A, C of card 10, and another control signal CS2 is sent. The contents of latches 22, 24 are not disturbed since a control signal CS1 is not sent during this time. Comparators 26, 28 detect when a match occurs between the address bits E, F on address lines A4, A5 and the hard physical address stored in the latches 22, 24. If a match is detected, then, by virtue of the control signal CS2, logic gate 30 strobes the clock inputs of latches 32, 34. This causes the code corresponding to the soft physical address to be latched into the latches 32, 34. Only the card that detects a match between its stored hard physical address and the address on the bus will accept the soft physical address for storage.

As a result of these two sequential operations, both the hard and soft physical address for each card are stored on the card. Moreover, the address range of each card may be individually set. Obviously, the circuitry of the exemplary card 10, and the circuitry of FIG. 4 may be expanded to suit any desired number of "select" address bits provided in a particular system.

In operation, a card is selected when a match occurs between the address bits E, F appearing at the inputs of comparators 36, 38 and the address range data stored in and provided by latches 32, 34. The individual locations are addressed by address bits A–D appearing on address lines A0–A3.

It should be appreciated that for a system having several cards that contain identical storage elements, such as memory cards and some I/O cards, it does not matter which one is selected for a given address, as long as it is unique. Thus, in the exemplary embodiment of FIGS. 1–4, additional address lines, i.e., address lines A0–A3 in the exemplary embodiment, could have their orders altered or reversed as above discussed, as long as the two step set up operation described above for setting the hard and soft physical addresses is employed. In most preferred embodiments of the invention, both the address lines that are employed for card selection and the address lines that are used for addressing individual locations on the card have their orders altered from card slot to card slot as above described.

To state the foregoing otherwise, the fact that address lines A0–A3 are switched frequently does not matter for cards, such as memory cards, as long as each unique combination on address lines A0–A3 uniquely accesses a location on the card. For example, sending address 0000 on address lines A0–A3 will select line 0 of demux 16 on all four cards, but address 0001 will select line 1 of demux 16 on cards in slots S1 and S3, and line 2 in slots S2 and S4, assuming that the binary ordering of address lines A0–A3 is from MSB to LSB. This does not matter, however, because, every time the processor desires to address a storage location it refers to as "0001", a card in slot S2 will respond by granting access to the register associated with line 2 of the demux.

Also, to state the foregoing somewhat differently, there is no reason that bits A4 and A5 may not also have their orders changed to extend the address mapping to eight slots. In this case, the order may need to be re-established after establishing a slot (see discussion below) to prevent multiple cards from responding to the same address. Moreover, it is not necessary to send the secondary code (i.e., the aforementioned code that sets the soft physical address) on the same signal lines on which the primary code (i.e., the code that sets the hard physical address) was sent.

Figure 5:
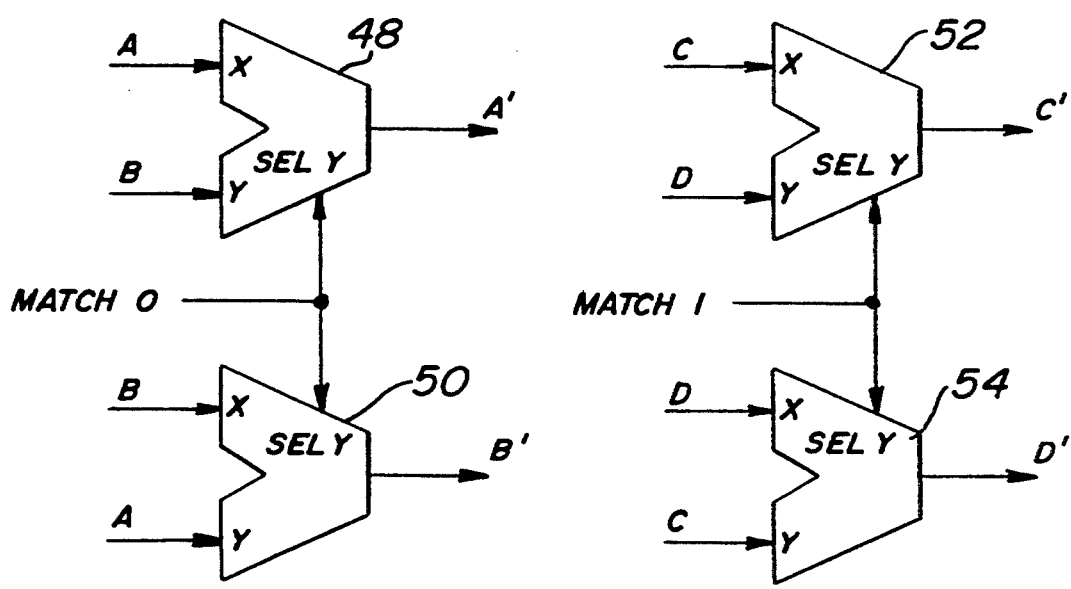
FIG. 5 illustrates circuitry for re-establishing on a card, the order of the address lines as emanating from a processor associated with the computer system.

In some applications, it may be necessary to effectively re-establish, on the card, the ordering of the address lines so that they coincide with the order in which they emanated from the processor. This may be true in the case of some I/O cards where individual addressable locations must be addressed with the address lines in the same order as emanating from the processor. One means for effectively re-establishing this order is illustrated in FIG. 5. Such circuitry is preferably provided directly on each card 10, as needed. The circuitry of FIG. 5 comprises a plurality of X-Y selectors 48–54 receiving pairs of the affected address lines. A pair of X-Y selectors 48, 50 is responsive to the MATCH 0 signal from latch 22 to select between one of the A, B address input lines on the card 10. Similarly, the X-Y selectors 52, 54 are responsive to the MATCH 1 signal from latch 24 to select between one of the address input lines C, D on the card. As shown, the address input lines A, B are provided to the X, Y inputs of the selector 48 in reverse order from selector 50. The same is true in the case of address input lines C, D provided to selectors 52, 54. It will therefore be appreciated that, after the hard physical address has been latched into the latches 22, 24, the selectors 48–54 will serve to select the "correct" address input line, and thereby re-establish, on the card, the order in which the address lines emanate from the processor.

Figure 6:
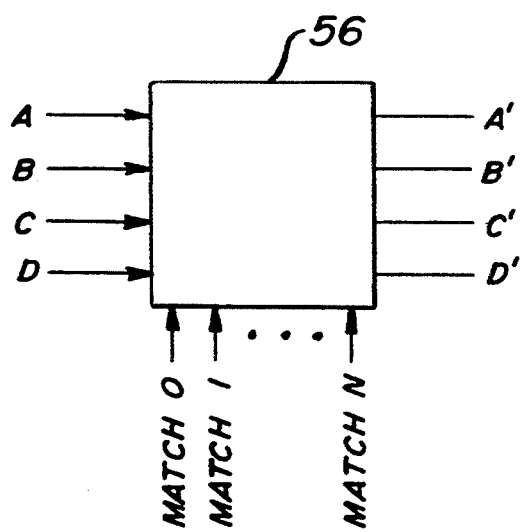
FIG. 6 illustrates an alternative embodiment of the circuitry of FIG. 5.

FIG. 6 illustrates an alternative to the circuitry of FIG. 5. A programmable logic array (PLA) or ROM 56 may be employed to re-establish the ordering of the address lines based upon the address bits A–D and the MATCH 0 and MATCH 1 signals. It will be appreciated that, in the case of the ROM, a simple lookup table may be employed to serve the purposes. In the case of the PLA, it may be similarly programmed.

Although implementation of the present invention restricts the number of slots that can be addressed, as discussed earlier, it uses only existing signals appearing on the bus to perform addressing, thus resulting in a savings in the number of signals required to perform addressing. Importantly, the invention does not require use of DIP switches for addressing.

The present invention may be embodied in other specific forms without departing from the spirit or essential attributes thereof, and, accordingly, reference should be made to the following claims rather than to the foregoing specification as indicating the scope of the present invention.

We claim:

1. Computer system comprising a bus having a plurality of address lines coupled to plural card slots in the system, each card slot receiving a different ordering of address lines than other ones of the card slots, the ordering of the address lines at each card slot being indicative of the physical location of the card slot relative to the other card slots in the system, wherein cards are installed in the card slots and each card comprises means responsive to a first remotely generated control signal for receiving a first code provided on at least selected ones of the address lines and for establishing therefrom a hard physical address of the card based at least in part upon the first code and the ordering of address lines at the slot in which the card is installed, the first code being received differently by each card as a result of the different ordering of address lines at each card slot.

2. Computer system according to claim 1 wherein each card further comprises means responsive to the hard physical address of the card, to a second code provided on at least selected ones of the address lines, and to a second remotely generated control signal for establishing a soft physical address of the card, said soft physical address determining an address range of the card.

3. Computer system according to claim 2 wherein the second code and second control signal are provided during an initial phase of operation of the computer.

4. Computer system according to claim 2 wherein said means for establishing a soft physical address comprises latch means having at least a pair of data inputs for receiving the second code and a clock input for receiving an indication that the card has been selected during the occurrence of the second control signal, the latch means latching the second code in response to the occurrence of the indication.

5. Computer system according to claim 1 wherein the first code and first control signal are provided during an initial phase of operation of the computer.

6. Computer system according to claim 1 wherein the ordering of selected pairs of address lines is reversed at each card slot relative to immediately preceding and immediately succeeding card slots in the system.

7. Computer system according to claim 6 wherein the ordering of a lowest order pair of address lines is reversed at every other card slot in the system, and the ordering of each succeeding higher order pair of address lines is reversed at half the frequency of the ordering of each immediately preceding pair of address lines.

8. Computer system according to claim 1 wherein the first code is an XOR pattern of bit pairs of the address lines.

9. Computer system according to claim 1 wherein said means for receiving the first code and for establishing a hard physical address therefrom comprises latch means having at least a pair of data inputs for receiving the first code and a clock input for receiving the first control signal, the latch means latching the first code in response to the occurrence of the first control signal.

10. Computer system according to claim 9 wherein said means for establishing a hard physical address further comprises comparator means for comparing the latched first code to address bits provided on selected ones of the address lines and providing an indication of the result of the comparison on an output thereof, and logic means responsive to the output of the comparator means and to an additional control signal for providing a signal indicating that the card has been selected during the occurrence of the additional control signal.

11. Computer system according to claim 1 wherein the address lines emanate from a processor associated with the computer system in a preselected order and cards are installed in the card slots and, in the case of any card slots whose received ordering of address lines is different from the preselected order, the cards installed therein comprise first means for effectively re-establishing the pre-selected order at the card.

12. Computer system according to claim 11 wherein each card further comprises second means for latching a code appearing on selected ones of the address lines during an initial phase of operation of the computer system and the first means comprises selector means receiving the address lines as inputs and responsive to the latched code for selecting the address lines in the preselected order.

13. Computer system comprising:
a) an address bus having a plurality of address lines;
b) a plurality of card slots coupled to the address lines, each card slot receiving a different ordering of address lines than other ones of the card slots, the ordering of the address lines at each card slot being indicative of a physical address of the card slot;
c) a plurality of cards for insertion into the card slots, each card comprising first means responsive to a first code provided on at least selected ones of the address lines and to a first remotely generated control signal for establishing a physical address of the card, a different code being provided to each said card due at least in part to the unique ordering of the address lines at each card slot, and, second means responsive to a second code provided on the selected ones of the address lines and to a second remotely generated control signal for establishing an address range of the card.

14. Computer system according to claim 13 wherein the address lines emanate from a processor associated with the computer system in a preselected order but the ordering changes from card slot to card slot, and each card further comprises selector means receiving address lines as inputs and responsive to an output of the first means to select between inputs to effectively re-establish the preselected order on the card.

15. Computer system according to claim 13, wherein the ordering of selected pairs of address lines is reversed at each card slot relative to immediately preceding and immediately succeeding card slots in the system, the ordering of a lowest order pair of address lines being reversed at every other card slot and the ordering of each succeeding higher order pair of address lines being reversed at half the frequency of the ordering of each immediately preceding pair of address lines.

16. Computer system comprising:
a) an address bus having a plurality of address lines emanating from a processor associated with the system in a preselected order;
b) a plurality of card slots coupled to the address lines and receiving an ordering of the address lines that is different from the preselected ordering, each card slot receiving a different ordering of address lines than other ones of the card slots, the ordering of selected pairs of address lines being reversed at each card slot relative to immediately preceding and immediately succeeding card slots in the system, the ordering of a lowest order pair of address lines being reversed at every other card slot and the ordering of each succeeding higher order pair of address lines being reversed at half the frequency of the ordering of each immediately preceding pair of address lines, the ordering of the address lines at each card slot being indicative of a physical address of the card slot;
c) a plurality of cards for insertion into the card slots, each card comprising first means responsive to a first code provided on at least selected ones of the address lines and to a first remotely generated control signal for establishing a physical address of the card, a different code being provided to each said card due at least in part to the unique ordering of the address lines at each card slot, and, second means responsive to a second code provided on the selected ones of the address lines and to a second remotely generated control signal for establishing an address range of the card, each card further comprising selector means receiving address lines as inputs and responsive to an output of the first means to select between inputs to effectively re-establish the preselected order of address lines on the card;
the address range of each card thereby being established without user intervention, switches or any dedicated signal pins on the card slots.

17. In a computer system having a plurality of address lines coupled to plural card slots in the system with the address lines emanating from a processor associated with the system in a preselected order, a method of addressing cards inserted in the card slots without user intervention, address switches on the cards or any dedicated signal pins on the card slots, said method comprising the steps of:
(a) routing the address lines to the card slots in a different order than the preselected order, each card slot receiving a different ordering of address lines than other ones of the card slots, the ordering of the address lines at each card slot being indicative of the physical location of the card slot relative to the other card slots in the system; and
(b) receiving at each card, in response to a first remotely generated control signal, a first code provided on at least selected ones of the address lines and establishing therefrom a hard physical address of the card based at least in part upon the first code and the ordering of the address lines at the slot in which the card is installed, the first code being received differently by each card as a result of the different ordering of address lines at each card slot.

18. Method according to claim 17 wherein the address lines are routed so that the ordering of selected pairs of address lines is reversed at each card slot relative to immediately preceding and immediately succeeding card slots in the system, the ordering of a lowest order pair of address lines being reversed at every other card slot and the ordering of each succeeding higher order pair of address lines being reversed at half the frequency of the ordering of each immediately preceding pair of address lines.

19. Method according to claim 18 wherein the ordering of the address lines at each card slot corresponds to an address range of the card.

20. Method according to claim 17 further comprising the step of determining at each card, in response to a second code provided on at least selected ones of the address lines and to a second remotely generated control signal, a soft physical address of the card for establishing an address range of the card.

21. Method according to claim 17 further comprising the step of effectively re-establishing the preselected order at each card.

22. A computer card for use in a computer system that comprises a bus having a plurality of address lines coupled to plural card slots in the system, wherein each card slot receives a different ordering of address lines than other ones of the card slots, the ordering of the address lines at each card slot being indicative of the physical location of the card slot relative to the other card slots in the system, said card being insertable into one of said slots and having means responsive to a first remotely generated control signal for receiving a first code provided on at least selected ones of the address lines and for establishing therefrom a hard physical address of the card based at least in part upon the first code and the ordering of address lines at the slot in which the card is installed, the card receiving the first code differently than other cards in the system as a result of the different ordering of address lines at each card slot.

23. The card recited in claim 22 wherein the card further comprises means responsive to the hard physical address of the card, to a second code provided on at least selected ones of the address lines, and to a second remotely generated control signal for establishing a soft physical address of the card, said soft physical address determining an address range of the card.

24. The computer card recited in claim 22 wherein said means for receiving the first code and for establishing a hard physical address therefrom comprises latch means having at least a pair of data inputs for receiving the first code and a clock input for receiving the first control signal, the latch means latching the first code in response to the occurrence of the first control signal.

25. The computer card recited in claim 24 further comprising comparator means for comparing the latched code to address bits provided on selected ones of the address lines and providing an indication of the result of the comparison on an output thereof, and logic means responsive to the output of the comparator means and to an additional control signal for providing a signal indicating that the card has been selected during the occurrence of the additional control signal.

26. The computer card recited in claim 22 wherein the address lines emanate from a processor associated with the computer system in a preselected order before being ordered differently at each card slot, and wherein the card further comprises means for effectively re-establishing the preselected order of the address lines at a slot in which the card is installed.

* * * * *